US010678270B2

(12) United States Patent
Torralba et al.

(10) Patent No.: US 10,678,270 B2
(45) Date of Patent: Jun. 9, 2020

(54) METHOD AND DEVICE TO CONTROL AIRCRAFT FLYING IN FORMATION

(71) Applicant: AIRBUS OPERATIONS (S.A.S.), Toulouse (FR)

(72) Inventors: José Torralba, Merville (FR); Julie Lebas, Toulouse (FR)

(73) Assignee: AIRBUS OPERATION (SAS), Toulouse (FR)

( * ) Notice: Subject to any disclaimer, the term of this patent is extended or adjusted under 35 U.S.C. 154(b) by 190 days.

(21) Appl. No.: 15/992,732

(22) Filed: May 30, 2018

(65) Prior Publication Data
US 2018/0348796 A1   Dec. 6, 2018

(30) Foreign Application Priority Data

May 30, 2017   (FR) ...................................... 1754760

(51) Int. Cl.
| | | |
|---|---|---|
| *G05D 1/10* | (2006.01) | |
| *B64C 13/18* | (2006.01) | |
| *G05D 1/08* | (2006.01) | |
| *B64C 19/00* | (2006.01) | |

(52) U.S. Cl.
CPC ............. *G05D 1/104* (2013.01); *B64C 13/18* (2013.01); *G05D 1/0825* (2013.01); *B64C 19/00* (2013.01)

(58) Field of Classification Search
CPC ...... G05D 1/104; G05D 1/0825; B64C 13/18; B64C 19/00
See application file for complete search history.

(56) References Cited

U.S. PATENT DOCUMENTS

| 8,219,264 B1* | 7/2012 | Blake ..................... B64D 39/00 |
|---|---|---|
| | | 701/3 |
| 2002/0075171 A1* | 6/2002 | Kuntman ............. G08G 5/0091 |
| | | 340/961 |
| 2003/0222795 A1* | 12/2003 | Holforty ................ B64D 43/00 |
| | | 340/968 |

(Continued)

FOREIGN PATENT DOCUMENTS

WO   2016/067019   5/2016

OTHER PUBLICATIONS

Search Report for FR1754760, dated Jan. 23, 2018, 2 pages.
(Continued)

*Primary Examiner* — Calvin Cheung
(74) *Attorney, Agent, or Firm* — Nixon & Vanderhye P.C.

(57) ABSTRACT

A method and device for monitoring and controlling a path of a following aircraft (AC2) with respect to vortices (V1, V2) generated by a leading aircraft (AC1) while both aircraft (AC1, AC2) fly in a formation (F), wherein the device includes a unit for determining, using a vortex transport model, a safety position (PS) at which the following aircraft (AC2) is not subjected to effects of the vortices (V1, V2) generated by the leading aircraft (AC1), a unit for determining, using a vortex signature model, an optimum position (PO) at which the following aircraft (AC2) benefits from at least one (V1) of the vortices (V1, V2), and a control unit for bringing and keeping the following aircraft (AC2) in the safety position (PS) while a predetermined condition(s) is met and otherwise for bringing the following aircraft (AC2) and keeping it in the optimum position (PO).

17 Claims, 2 Drawing Sheets

(56) References Cited

U.S. PATENT DOCUMENTS

| | | | | |
|---|---|---|---|---|
| 2006/0244637 A1* | 11/2006 | Baranov | ................ | G05D 1/104 |
| | | | | 340/968 |
| 2008/0030375 A1* | 2/2008 | Cotton | ................... | G01S 17/86 |
| | | | | 340/945 |
| 2008/0035789 A1* | 2/2008 | Lewis | ................ | G08G 5/0008 |
| | | | | 244/1 R |
| 2014/0136110 A1* | 5/2014 | Nykl | ...................... | G01W 1/02 |
| | | | | 702/3 |
| 2014/0214243 A1* | 7/2014 | Whitehead | .......... | G05D 1/0202 |
| | | | | 701/3 |
| 2015/0235559 A1* | 8/2015 | Alekseev | .............. | G05D 1/104 |
| | | | | 701/120 |
| 2017/0267371 A1* | 9/2017 | Frolov | ................... | B64D 43/02 |
| 2017/0315564 A1* | 11/2017 | Thomas | ................. | B64C 19/00 |
| 2019/0004544 A1* | 1/2019 | Feldmann | ............ | G08G 5/0021 |

OTHER PUBLICATIONS

D. Saban et al., "Abstract", Aeronautical Journal, vol. 113, No. 1149, Nov. 1, 2009, pp. 727-738.

Nash Ahmad et al., "Review of Idealized Aircraft Wake Vortex Models", 52nd AIAA Aerospace Sciences Meeting; Jan. 13-17, 2014, 28 pages.

M. Brashears, "Aircraft Wake Vortex Transport Mode!", J. Aircraft, vol. 11, No. 5 (May 1974), 8 pages.

\* cited by examiner

METHOD AND DEVICE TO CONTROL AIRCRAFT FLYING IN FORMATION

RELATED APPLICATION

This application claims priority to French Patent Application 1754760 filed May 30, 2017, the entirety of which is incorporated by reference.

TECHNICAL FIELD

The present invention relates to a method and to a device for monitoring and controlling the path of an aircraft, termed following aircraft, with respect to vortices generated by an aircraft, termed leading aircraft, in front of said following aircraft. The leading and following aircraft fly in formation.

A formation flight comprises at least two aircraft, including a leading aircraft (or leader) and one or more following aircraft. These aircraft may be transport aircraft flying formation. The following aircraft directly follows a lead in formation of two or more aircraft. The following aircraft maintains a constant spacing with the lead aircraft. The following and lead aircrafts may cruise at the same flight altitude, fly the same flight path and maintain the same air speed. The following aircraft may fly under control orders, such as generated by an automatic pilot system, that cause the following aircraft to have the same position, the same speed and the same acceleration as did the lead aircraft when the lead aircraft flew through the same point on a flight path as being flown by the following aircraft.

BACKGROUND OF INVENTION

An aircraft in flight generates vortices (or wake turbulence) in its wake. The term vortex (or wake turbulence) is understood to mean aerodynamic turbulence (or a vortex) that forms downstream of an aircraft in flight.

An aircraft in flight primarily generates two vortices in its wake. These two vortices start at the wing tips and form due to pressure differences between the lower surface and the upper surface of the wing that cause a deflection of the air flow at the wing tip. These vortices at the wing tip are counter-rotating vortices and are characterized by a wind field that rises overall outside of the vortices and that falls overall between the vortices.

The wing tip vortices start from the wing tips and extend behind the aircraft and along the path just flown by the aircraft. The wing tip vortices tend to initially move towards each other and thereafter maintain a a constant separation from one another while at the same time losing altitude with respect to the altitude at which they were generated.

Formation flying allows a following aircraft to exploit the updrafts caused by the vortices of the leading aircraft. An advantage of exploiting the vortices is reduced fuel consumption by the following aircraft. However, situations may arise during a formation flight due to a maneuver or other minor event in which a following aircraft should move away from a vortex(ies) of the leading aircraft. Moving away from the vortices results in the following aircraft losing the updraft of the vortex(ies) and the benefits of the updrafts and lower fuel consumption.

SUMMARY OF THE INVENTION

The inventors conceived and disclose herein a method for monitoring and controlling the path of a following aircraft with respect to vortices generated by a leading aircraft such that the following aircraft is flow to take advantage of the vortices or is flow away from the vortices.

In one embodiment, the invention is a method including the steps of:

a first position determination step, implemented by a first position determination unit, wherein said first position determination step comprises determining, using a vortex transport model, what is termed a safety position, in which the following aircraft is not subjected to effects of the vortices generated by the leading aircraft while at the same time continuing to fly in formation;

a second position determination step, implemented by a second position determination unit, wherein said second position determination step comprises determining, using a vortex signature model, what is termed an optimum position, in which the following aircraft flying in formation benefits from effects of at least one of the vortices generated by the leading aircraft (such as positioning the following aircraft to fly in an updraft from a vortex of the leading aircraft);

a control step implemented by a control unit, wherein the control step includes:

(i) in bringing and in keeping the following aircraft in said safety position determined in said first position determination step, if and for as long as predetermined conditions are met; and (ii) otherwise, in bringing it and in keeping the following aircraft in the optimum position, by jointly implementing the second position determination step.

The above described methods embodying the invention allow a following aircraft to be flown into a safety position (without a vortex) without breaking the formation flight, if and for as long as predetermined conditions are satisfied. The following aircraft may be moved to a safety position due to minor flight related events or due to particular maneuvers of the aircraft. The safety position is such that the following aircraft is not subjected to effects of the vortices generated by the leading aircraft. This safety position may be reached swiftly, as explained below.

The methods embodying the invention may additionally and for the rest of a flight, cause the following aircraft to return to and maintain an optimum position in which the aircraft benefits from vortices generated by an immediately preceding.

The invention may be embodied as a method, such as described herein, that allows a following aircraft to remain in formation while moving moved between a position in which the aircraft enjoys the benefits of the vortex(ices) of the leading aircraft and a safety position away from the vortex(ies).

The first position determination step may include determining, using a vortex transport model, a geographical position of at least the vortex closest to the following aircraft, and determining, as a safety position, a position for the following aircraft that is spaced at least laterally with respect to the path of the leading aircraft and that is situated outside of said geographical position of the vortex. The first position determination step may include in determining, as a safety position, a position that is also spaced vertically with respect to the path of the leading aircraft.

Moreover, the second position determination step may include determining an optimum position using the vortex signature model and current measurements representative of the signature that are performed on the following aircraft.

Furthermore, the second position determination step may include estimating, using the vortex transport model and data originating from the leading aircraft, a speed of approach of the vortex, seen from the following aircraft, and in using this estimation to refine the optimum position.

Moreover, to bring and keep the following aircraft in an optimum position, the control step may include controlling the following aircraft to reduce any difference between a calculated spacing between a setpoint spacing between aircraft and the actual spacing between aircraft determined from the current position the following aircraft with respect to the vortex of the preceding aircraft. The calculated spacing corresponds to a distance between a core of the vortex of the preceding aircraft and the wing tip of the following aircraft. The setpoint spacing may be less than or equal to a predetermined value dependent on the following aircraft.

Moreover, the certain or predetermined conditions may be one or more of the following conditions:

(i) at least one particular weather condition;

(ii) at least one particular maneuver of the leading and following aircraft flying in formation;

(iii) an approach of at least one aircraft, other than the leading aircraft and the following aircraft, to said formation flight;

(iv) at least one impaired flight situation of at least one of the leading and following aircraft.

The present invention also relates to a device for monitoring the path of an aircraft, termed following aircraft, with respect to vortices generated by an aircraft, termed leading aircraft, in front of said following aircraft, said leading and following aircraft flying in formation. In one embodiment the device includes:

(i) a first position determination unit configured to determine a safety position with respect to the leading aircraft and using a vortex transport model at which the following aircraft is not subjected to effects of the vortices generated by the leading aircraft while continuing to fly in formation;

(ii) a second position determination unit configured to determine, using a vortex signature model, what is termed an optimum position, in which the following aircraft flying in formation benefits from effects of at least one of the vortices generated by the leading aircraft; and (iii) at least one control unit, said control unit being configured:

(a) to bring and to keep the following aircraft in said safety position determined by said first position determination unit, if and for as long as predetermined conditions are met; and (b) otherwise, to bring it and to keep it in the optimum position, by jointly acting with said second position determination unit.

The present invention moreover relates to an aircraft, in particular a transport plane, which is equipped with a path-monitoring device such as the one described above.

BRIEF DESCRIPTION OF THE FIGURES

The appended figures will make it easy to understand how the invention may be embodied. In these figures, identical references denote similar elements. More particularly.

DETAILED DESCRIPTION

Figure 1:
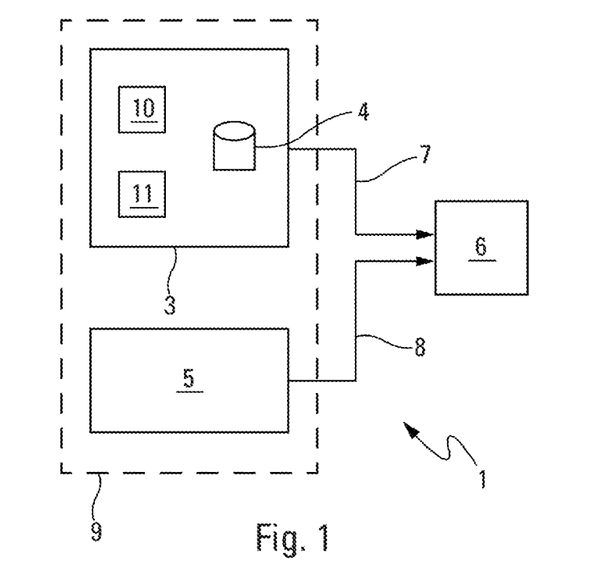
FIG. 1 is a schematic overview of one particular embodiment of a monitoring device according to the invention.
Figure 2:
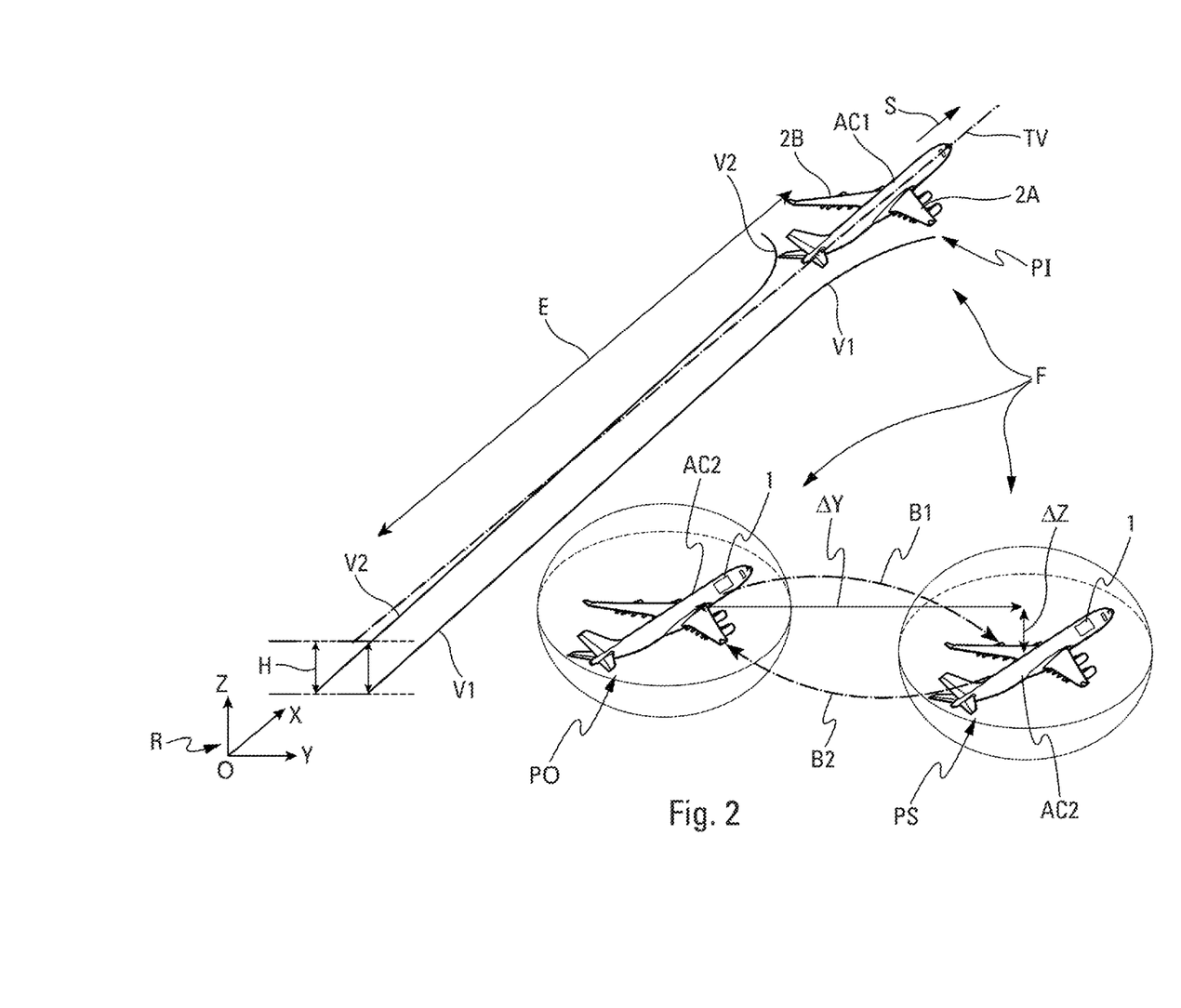
FIG. 2 is a schematic depiction of a formation flight, showing a leading aircraft generating vortices and two possible positions for a following aircraft with respect to these vortices.

Device 1, which is shown schematically in FIG. 1, may be embodied as a computer system configured to monitor a path of a following aircraft AC2 with respect to vortices V1 and V2 generated by a leading aircraft AC1. The leading aircraft AC1 the aircraft in the formation with and immediately preceding the following aircraft AC2, as illustrated in FIG. 2. The leading and following aircrafts (AC1, AC2) are for example two transport planes are flying in formation F. The device 1 is installed in the following aircraft AC2, as shown highly schematically in FIG. 1.

As is conventional, the formation F comprises the leading aircraft AC1 and one or more following aircraft, such as the single following aircraft AC2 shown in FIG. 2. The leading aircraft AC1 is at a position PI. The following aircraft follows the leading aircraft AC1, which follow(s) the leading aircraft AC1 (situated at a position PI) in such a way as to keep a constant spacing E between them. In one preferred application, in particular when cruising, the aircraft AC1 and AC2 fly behind one another at the same flight level, with the same course and the same speed.

In one embodiment, the device 1 forms part of a formation flight management computer unit in the following aircraft AC2. The flight management unit is configured to manage the formation flight at least for the following aircraft AC2. The flight management computer unit may be an avionics control system with a processor and a non-transitory memory.

The leading aircraft AC1 follows a flight path TV. The leading aircraft generates primarily generates two vortices V1 and V2 in its wake, namely a vortex V1 and V2 starting from each of its wings 2A and 2B. These vortices are formed due to pressure difference between the lower surface and the upper surface of each wing, and of the downward deflection of the air flow that results therefrom. These vortices V1 and V2 are counter-rotating vortices and are characterized by a wind field that rises overall outside of the vortices and that falls overall between the vortices. Starting from the wings 2A and 2B, the vortices V1 and V2 tend to initially move towards one another, and later to maintain a more or less constant distance from one another while losing altitude with respect to the altitude at which they were generated, as shown in FIG. 2 by a double-headed arrow H.

To facilitate the following description, an orthonormal reference frame R is specified, shown in FIG. 2 and formed from three axes (or directions) X, Y and Z that are orthogonal to one another and pass through a point O, and are such that:

X is the longitudinal axis of the fuselage of the leading aircraft AC1 oriented positively in the direction of travel S of the leading aircraft AC1;

Z is a vertical axis that forms, with the X-axis, a plane corresponding to the vertical plane of symmetry of the leading aircraft AC1; and Y is a transverse axis that is orthogonal to said X- and Z-axes.

Although the point O is shown outside the leading aircraft AC1 in FIG. 2 for the sake of clarity, it may correspond to the centre of gravity of the leading aircraft AC1.

As shown in FIG. 1, the device 1 includes:

a position determination unit 3. The position determination unit 3 is configured to determine, using a vortex transport model outlined below and recorded for example in a database 4, a safety position PS (FIG. 2), in which the following aircraft AC2 is not subjected to effects of the vortices V1 and V2 generated by the leading aircraft AC1 while at the same time continuing to fly in formation;

a position determination unit 5. The position determination unit 5 is configured to determine, using a vortex signature model outlined below, an optimum position PO (FIG. 2), in which the following aircraft AC2 flying in formation benefits from effects of at least one of the vortices generated by the leading aircraft AC1, namely the vortex V1 (in this case on the right-hand side) closest to the following aircraft AC2; and a control unit 6 configured:

(i) to bring and to keep the following aircraft AC2 in said safety position PS determined by the position determination unit 3 and received via a link 7, if and for as long as predetermined conditions (outlined below) are met; and (ii) otherwise (in a normal flight situation in which none of these predetermined conditions are met), to bring it and to keep it in the optimum position PO, by jointly acting with the position determination unit 5 (as illustrated by a link 8).

In one particular embodiment, the units 3 and 5 are integrated into one and the same central processing unit 9, which includes a processor(s) and non-transient memory storing computer programs and data to be executed and used by the processors to perform the functions of the units 3 and 5.

The control unit 6 comprises all of the usual means necessary to manually or automatically pilot the following aircraft AC2. The control unit 6 may have the avionics typically associated with an autopilot device and computer systems configured to perform the functions of units 3 and 5.

The device 1 makes it possible to bring, such as via an autopilot function, the following aircraft AC2 into a safety position PS (without a vortex) without breaking the formation flight, if and for as long as particular predetermined conditions are satisfied. As outlined hereinafter, this may involve minor events or particular maneuvers or emergency situations requiring a safety procedure. This safety position PS is such that the following aircraft AC2 is not subjected to effects of the vortices V1 and V2 generated by the leading aircraft AC1. As outlined herein below, this safety position PS may be reached swiftly by the following aircraft AC2.

In one particular embodiment, said predetermined conditions comprise at least one of the following conditions:

(i) at least one particular weather condition;

(ii) at least one particular maneuver of the leading and following aircraft flying in formation, such as a change of course or of level;

(iii) an approach of at least one aircraft (other than the leading aircraft and the following aircraft) to said formation flight;

(iv) at least one impaired flight situation of at least one of the leading and following aircraft.

On the other hand, for the rest of the flight (outside of these particular conditions), the role of the device 1 is to keep, such as using an autopilot function, the following aircraft AC2 in the optimum position PO (and, where applicable, to return it there), in which it benefits from the effects of the vortex V1 generated by the leading aircraft AC1, thereby making it possible to reduce its fuel consumption.

The optimum position PO is such that:

(i) the following aircraft AC2 is able to be piloted;

(ii) it does not interfere with the systems, the structure and the engines of the following aircraft AC2;

(iii) it does not generate discomfort for the passengers of the following aircraft AC2; and (iv) it affords benefits, in particular in terms of fuel consumption, for the following aircraft AC2.

For example, the optimum position PO may be a position at which the following aircraft in an updraft created by a vortex of the leading aircraft.

The device 1 thus enables the following aircraft AC2, on which it is installed, still to retain the advantages, in particular in terms of cost, of flying in formation, and, to the greatest possible extent, the additional advantages brought about by the positive effects of the vortex.

In one particular embodiment, the position determination unit 3 includes, as shown in FIG. 1, a calculating unit 10 that is configured to determine, using the vortex transport model stored in the database 4, a geographical position at least of the vortex closest to the following aircraft AC2, namely the right-hand vortex V1 in FIG. 2. The vortex transport model depends (as is conventional) on features of the leading aircraft AC1 (mass, wingspan, etc.) and on features of the current flight position, such as speed of the following aircraft AC2, wind speed and direction and other conditions.

The position determination unit 3 also includes a calculating unit 11 that is configured to determine, as a safety position PS, a position that is situated outside of the geographical position of the vortex V1 determined for the calculating unit 10. This safety position PS is spaced at least laterally (along the Y-axis) with respect to the path TV of the leading aircraft AC1 by a predetermined distance, for example 300 metres. The safety position PS may be a position that is also spaced vertically (along the Z-axis) with respect to the wind-corrected path TV of the leading aircraft AC2, as shown in FIG. 2.

Figure 3:
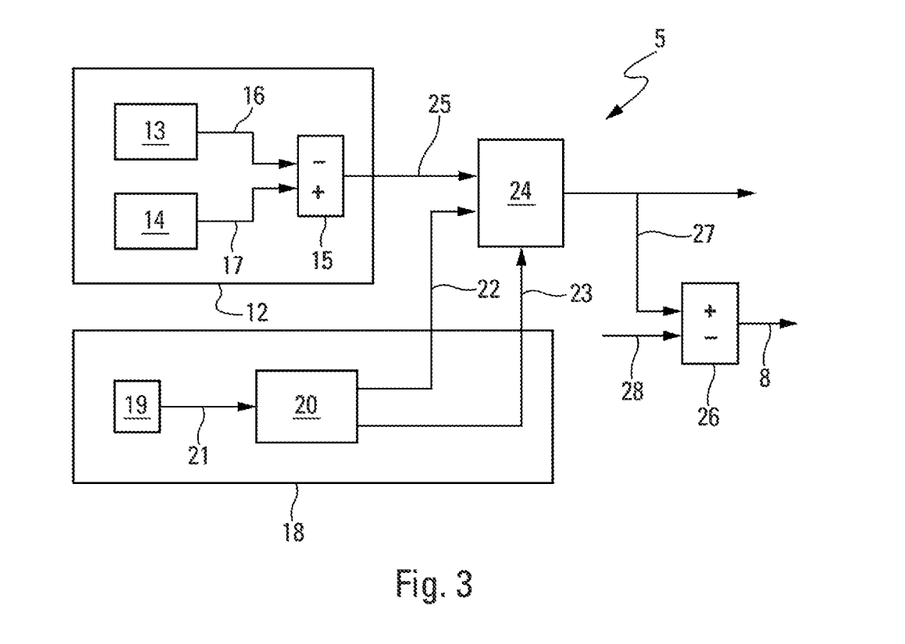
FIG. 3 is a schematic overview of an optimum position determination unit of the monitoring device.

Moreover, the position determination unit 5 of the device 1 includes, as shown in FIG. 3, a calculating assembly 12 configured to determine the optimum position PO using the vortex signature model and current measurements representative of the signature or that make it possible to calculate the signature, which measurements are performed on the following aircraft AC2.

To this end, the calculating assembly 12, which may be a computer system, comprises:

(i) a unit 13 incorporating the vortex signature model and that makes it possible to define defining a predicted (or estimated) signature;

(ii) a measurement and calculating assembly 14 comprising in particular conventional sensors of the following aircraft AC2, said assembly 14 being configured to perform current measurements on the following aircraft AC2 and to deduce a current signature (termed measured signature) therefrom on the basis of these current measurements; and (iii) a calculating element 15 that is linked via links 16 and 17 to the database 13 and to the assembly 14, respectively, and that calculates the difference between the measured signature and the predicted signature.

The vortex signature model used by the calculating assembly 12 is based on a model of the spatial distribution of the wind generated by the vortex and of its effect on the following aircraft. To this end, it is possible to use various common models, including the Burnham-Hallock model. With regard to the measured signature, this represents the measurement of this effect using the sensors of the following aircraft AC2.

The unit 5 additionally includes a calculating assembly 18. This calculating assembly 18 comprises:

(i) a data reception element 19 that receives data from the leading aircraft, in particular information for deducing a lateral distance $\Delta Y_{F/L}$ between the following aircraft and the leading aircraft. The data may include the leading aircraft's flight speed, altitude, three or two dimensional position with respect to the ground, type of aircraft, intended flight path, current position of the leading aircraft along an intended flight path, and/or deviation of the actual flight path of the leading aircraft from the intended flight path.

(ii) a calculating element 20 that enters the data (received by the data reception element 19) into the vortex transport model (via a link 21) and that transmits, at output, via links 22 and 23, data $\Delta Y_{F/VW}^{Init}$ and $\Delta \dot{Y}_{F/WV}^{ff}$ outlined below.

The values received by the data reception element 19 of the leading aircraft AC1, in particular those for determining the lateral distance $\Delta Y_{F/L}$ form part of data transmitted by the leading aircraft AC1 to the following aircraft AC2 via a conventional communication link such as used by traffic collision avoidance systems (TCAS) on the two aircraft (AC1, AC2). The TACS on each aircraft (AC1, AC2) may each include transponders configured to interrogate and exchange data with a TCAS on a nearby aircraft, such as AC2. Also, data to be used to determine the lateral distance $\Delta Y_{F/L}$ may be received at the following aircraft (AC2) by an automatic dependent surveillance—broadcast (ADS-B) system on the leading aircraft (AC1). The ADS-B may transmits position information regarding AC1 that is received by the following aircraft (AC2).

The calculating element 20 is configured to estimate, using the vortex transport model, a speed of approach of the vortex, seen from the following aircraft, this estimation then being used to refine the optimum position.

The unit 5 additionally includes a hybridization unit 24 that is linked, via a link 25, to the assembly 12 and, via the links 22 and 23, to the assembly 18, and that carries out a hybridization.

The hybridization makes it possible to use the signature of the following aircraft to perform positioning, coupled with the data from the leading aircraft.

The hybridization makes it possible to improve positioning accuracy by exploiting the signature of the vortex, which signature is measured on the following aircraft AC2. With some properties of the spatial signature of the vortex being known via the vortex signature model, measuring this signature on the following aircraft AC2 makes it possible to obtain real-time feedback of the proximity of the vortex.

Taking the data from the leading aircraft AC1 into account also makes it possible to increase the swiftness with regard to the estimated position (in particular upon movements of the leading aircraft). More precisely:

(i) the data $\Delta Y_{F/VW}^{Init}$ originating from the vortex transport model make it possible to initialize the hybridization upon a change from the safety position to the optimum position; and (ii) the data $\Delta \dot{Y}_{F/VW}^{ff}$ originating from the vortex transport model make it possible to anticipate the movements of the leading aircraft AC1 without waiting for the effects thereof to be felt by the following aircraft AC2.

The hybridization (implemented by the hybridization unit 24) between the data from the vortex transport model and those from the vortex signature on the following aircraft AC1 is performed using a Kalman filter.

The Kalman filter, which is integrated into the hybridization unit 24, incorporates a model of the spatial signature of the vortex, and performs the following actions:

(i) filtering on the measurement of the signature of the vortex and possible noise and bias;

(ii) calibrating the amplitude, predicted by the model, of the vortex with respect to the effectively measured signature, the proximity to the vortex depending on the amplitude of the measured signature; and (iii) comparing the amplitude of the signature with that predicted by the model (calibrated) and estimating the spacing (or distance) $\Delta \hat{Y}_{F/WV}$ of the following aircraft AC2 with respect to the vortex.

In one preferred embodiment, the spacing parameter under consideration ($\Delta \hat{Y}_{F/WV}$) corresponds to the distance between the core of the vortex V1 taken into account and the wing tip of the following aircraft AC2 that is closest to this vortex V1.

The estimated spacing (or distance) $\Delta \hat{Y}_{F/WV}$ with respect to the vortex V1 thus depends on:

(i) the difference between the signature predicted by the vortex signature model and the measured signature, this term affording the accuracy of the positioning (but it is relatively slow); and (ii) the travel speed of the vortex, which speed is taught by the vortex transport model. The latter term makes it possible to make the estimation highly reactive in the event of movement of the leading aircraft AC1. To this end, it suffices for the link between the two aircraft to be established, for example via an ADS-B system. If this link is lost, the estimation continues to work, but it is less reactive as it is based solely on the measurement of the effect of the vortex on the following aircraft AC2.

The item of data $\Delta \dot{Y}_{F/WV}^{ff}$ is an estimation of the speed of approach of the vortex seen from the following aircraft AC2, using only data from the vortex transport model, that is to say essentially data from the leading aircraft AC1. In the Kalman filter, this variable ensures that the estimated variation in the distance to the vortex is coherent with the measured variation. This advance order ('feedforward') has the advantage of increasing the reactivity of the Kalman filter. When the vortex moves, it is not expected for the reaction to be implemented on the following aircraft, but information about this is provided directly by this advance order.

The initialization (via the item of data $\Delta Y_{F/VW}^{Init}$) is defined by the accuracy, known a priori, of the information provided by the ADS-B system, including GPS (positioning) data from the leading aircraft (typically with a maximum error of 50 m) that the Kalman filter endeavours to reduce by using a model of the effect of the vortex on the following aircraft AC2. To this end, the device 1 initializes the Kalman filter with the best data that it has before the start of the approach of the vortex, that is to say the data from the vortex transport model (supplied in particular with the GPS data transmitted by the ADS-B system).

As is conventional, the ADS-B system operates in a broadcast mode. The leading aircraft AC1 regularly sends its position and other information through a radio broadcast to all interested users, that is to say ground control, and also other aircraft if they are equipped with a receiver. The ADS-B system thus allows the following aircraft AC2 to know in particular the position of the leading aircraft AC1, as well as other information such as its speed, its course, etc.

Inside the unit 5, the assembly 12 that uses data from the following aircraft AC2 implements its processing operations at a low frequency, whereas the assembly 18 that uses data from the leading aircraft AC1 implements its processing operations at a high frequency.

The unit 5 additionally comprises a calculating element 26 that calculates the difference between the estimated (spacing) value $\Delta \hat{Y}_{F/WV}$ received via a link 27 from the hybridization unit 24 and a predetermined desired (spacing) value $\Delta Y_{F/WV}$ (or setpoint spacing), received via a link 28. This difference is then transmitted to the control unit 6, which controls, in a conventional manner, the following aircraft AC2 in accordance with this value.

To bring and keep the following aircraft AC2 in the optimum position PO, the control unit 6 is therefore configured to control the following aircraft AC2 such that it cancels out the difference between the estimated spacing value (of the current position of said following aircraft AC2 with respect to the vortex V1) and the setpoint spacing.

The desired spacing value $\Delta Y_{F/WV}$ (or setpoint spacing) corresponds to the spacing (or distance) with respect to the vortex at which it is desired to position the following aircraft AC2 in order to recover the lift generated by the vortex of the leading aircraft AC1. This value represents a compromise between various parameters, such as benefit, comfort, control, etc.

This setpoint spacing is less than or equal to a predetermined value that is dependent on features of the following aircraft, for example 30 metres for an aircraft corresponding to a medium-haul commercial plane.

The device 1, as described above, thus allows the following aircraft AC2 to have two positions (optimum position PO and safety position PS) in the proximity of the vortex V1 under consideration. More particularly, said device 1 allows the following aircraft AC2 to maintain its position on the basis of the vortices generated by the leading aircraft AC1, so as to be able to benefit from the updraughts, while at the same time regularly updating the data relating to the leading aircraft AC1.

Flying in formation using said device 1 is carried out as follows.

When flying in formation, in a normal situation, and as long as it remains possible, the following aircraft AC2 is kept in the optimum position PO where it benefits both from flying in formation and from the positive effects of the vortex V1.

When a particular predetermined event occurs, if necessary, the following aircraft AC2 is brought swiftly into the safety position PS, as illustrated by an arrow B1 in FIG. 2, without the formation flight being broken.

The primary criterion for changing the following aircraft AC2 from the optimum position PO to the safety position PS is swiftness.

The safety position PS is laterally distant enough from the flight path TV and from the vortices V1 and V2 (typically at least 200 metres) that the following aircraft AC2 does not feel any effect of the closest vortex V1. To position in this zone, use is made of ADS-B data, measured data, etc., which are supplied to the vortex transport model. The position of the safety position PS is directly dependent on the accuracy of the model and of its input data. In the safety position PS, the following aircraft AC2 continues to fly in formation and is responsible for its separation from the leading aircraft AC1.

The safety position PS may be used in particular for the following situations or events:
(i) for weather conditions that do not allow precise control (for example, passing through a turbulent zone);
(ii) for particular maneuvers of the two aircraft AC1 and AC2, such as a change of course or a change of level;
(iii) for instances of impairment (system outage, fault, etc.) of the following aircraft AC2, which require action on the part of the pilot of said following aircraft AC2; and
(iv) the entry of a third aircraft into the zone under consideration.

When the event that resulted in the change to the safety position PS has stopped, the following aircraft AC1 is returned to the optimum position PO, without the formation flight being broken.

To this end, the following aircraft AC2 is controlled so as to approach the vortex V1 laterally (along the Y-axis), as illustrated by an arrow B2 in FIG. 3, and to position itself vertically, so as to gradually feel the effects of the vortex, and then to initialize estimators based on wind speed sensors, lateral moments, lateral controls, etc. The following aircraft AC2 is then used as a sensor, and the various conventional sensors of the following aircraft AC2 are used to identify the environment in which it is situated and to position it with respect to known signatures of this environment. This position may be spatial, and may be based on the features generated by the vortex: velocity field, flow, etc., which generate unambiguous effects on the following aircraft AC2 (lateral moment, asymmetrical lift, etc.).

The primary criterion for the following aircraft AC2 changing from the safety position PS to the optimum position PO (lateral movement of $\Delta Y$ and vertical movement of $\Delta Z$) is the accuracy of this optimum position PO.

The device 1, as described above, thus makes it possible to have two positions (optimum position PO and safety position PS) that are controlled with respect to the leading aircraft AC1, thereby making it possible to minimize untimely breakages of formation for (generally minor) events that do not warrant this. More precisely, the device 1 makes it possible:

(i) to define a fallback position (the safety position PS) that does not break the formation and that the following aircraft AC2 is able to readopt swiftly; and (ii) from this safety position, to return to the optimum position PO that is defined accurately.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for monitoring a path of a following aircraft (AC2) with respect to vortices (V1, V2) generated by a leading aircraft (AC1) flying in formation (F) with and in front of the following aircraft (AC2), wherein the method includes:

a first position determination step, implemented by a first position determination unit which includes determining, using a vortex transport model, a safety position (PS) at which the following aircraft (AC2) is not subjected to effects of the vortices (V1, V2) generated by the leading aircraft (AC1) while the following aircraft (AC2) remains in the formation (F);

a second position determination step, implemented by a second position determination unit (5), including determining, using a vortex signature model an optimum position (PO) at which the following aircraft (AC2)

while flying in the formation (F) benefits from effects of at least one (V1) of the vortices (V1, V2) generated by the leading aircraft (AC1);

a control step implemented by a control unit, said control step comprising:
(a) maneuvering the following aircraft (AC2) to the safety position (PS) if and for as long as a certain flight condition are met; and
(b) maneuvering the following aircraft (AC2) to the optimum position (PO), if and for as long as the certain flight condition is not met.

2. The method according to claim 1, wherein the first position determination step includes determining, using the vortex transport model, a geographical position of at least the vortex (V1) closest to the following aircraft (AC2) from among said vortices (V1, V2), and determining the safety position (PS) to be a position spaced at least laterally with respect to a path (TV) of the leading aircraft (AC1) and situated out of said geographical position of the at least the vortex (V1).

3. The method according to claim 2, wherein the first position determination step includes determining the safety position (PS) to be a position that spaced vertically at least a certain distance from a path (TV) of the leading aircraft (AC1).

4. The method according to claim 1, wherein the second position determination step includes determining the optimum position (PO) using the vortex signature model and current measurements representative of a signature performed on the following aircraft (AC2).

5. The method according to claim 1, wherein the second position determination step includes estimating, using the vortex transport model and data originating from the leading aircraft (AC1), a relative speed of approach of the vortex (V1) with respect to the following aircraft (AC2), and using the estimated relative speed to refine the optimum position (PO).

6. The method of claim 1 wherein in that, to bring and keep the following aircraft (AC2) in said optimum position (PO), the control step includes controlling the following aircraft (AC2) to reduce a difference between a current spacing of the following aircraft (AC2) with respect to the vortex (V1) and a setpoint spacing.

7. The method according to claim 6, wherein that the certain setpoint spacing corresponds to a distance between a core of the vortex (V1) and a wing tip of the following aircraft (AC2) nearest the vortex (V1), wherein the setpoint spacing is less than or equal to a predetermined value dependent on the following aircraft (AC2).

8. The method according to claim 1, wherein in that the certain conditions comprise at least one of:
at least one particular weather condition;
at least one particular maneuver of the leading and following aircraft (AC1, AC2) flying in formation (F);
an approach of at least one aircraft, other than the leading aircraft (AC1) and the following aircraft (AC2), to said formation flight (F);
at least one impaired flight situation of at least one of the leading and following aircraft (AC1, AC2).

9. A device for monitoring a path of a following aircraft (AC2), wherein the path is with respect to at least one of the vortices (V1, V2) generated by a leading aircraft (AC1) flying in formation with and in front of the following aircraft, said leading and following aircraft (AC1, AC2) flying in formation (F), wherein the device includes:
a first position determination unit configured to determine, using a vortex transport model, a safety position (PS) in which the following aircraft (AC2) is not subjected to effects of the vortices (V1, V2) generated by the leading aircraft (AC1) while continuing to fly in the formation (F);
a second position determination unit configured to determine, using a vortex signature model, an optimum position (PO) at the following aircraft (AC2) flying in formation (F) benefits from effects of at least one vortex (V1) of the vortices (V1, V2) generated by the leading aircraft (AC1); and
at least one control unit configured to:
(i) automatically maneuver the following aircraft (AC2) to the safety position (PS) while a predetermined condition is met; and
(ii) automatically maneuver the following aircraft (AC2) to the optimum position (PO) by jointly acting with said second position determination unit (5) and while the predetermined condition is not met.

10. A method to monitor and control a flight path of a following aircraft flying in formation behind a leading aircraft, the method comprising:
the following aircraft automatically receiving data from the leading aircraft indicative of a current position of the leading aircraft;
the following aircraft being automatically controlled to fly in formation with the leading aircraft;
automatically estimating conditions of a vortex formed by the leading aircraft, wherein the estimated conditions include a relative speed at which the vortex is approaching the following aircraft;
the following aircraft automatically and repeatedly calculating an optimal position, wherein the optimal position is a position of the following aircraft relative to the vortex at which the following aircraft flies in an updraft created by the vortex;
the following aircraft automatically and repeatedly calculating a safety position, wherein the safety position is a position of the following aircraft relative to the vortex at which the following aircraft flies beyond aerodynamic effects of the vortex;
while flying in the formation, automatically maneuvering the following aircraft to fly at the optimal position, and
while flying in the formation, automatically maneuvering the following aircraft from the optimal position to the safety position in response to a certain flight condition.

11. The method of claim 10 wherein the calculation of the optimal position is performed using a vortex signature model to estimate the position of the vortex.

12. The method of claim 10 wherein the calculation of the safety position is preformed using a vortex transport model to estimate a geographical position of the vortex to determine the safety position as a position laterally offset at certain distance or range of distances from a flight path of the leading aircraft.

13. The method of claim 10, wherein the optimum position is determined by using a vortex transport model and the data received from the leading aircraft to estimate a relative speed of approach of the vortex with respect to the following aircraft, and using the estimated relative of approach to determine the optimum position.

14. The method of claim 10 wherein the step of automatically maneuvering the following aircraft to fly at the optimal position includes reducing a difference between a setpoint spacing and a current spacing between the following aircraft and the vortex.

15. The method of claim 14 wherein the setpoint spacing is a distance between a core of the vortex and a wing tip of the following aircraft.

16. The method of claim 10, wherein the certain flight condition is at least one of:
   a specific weather condition;
   a specific current flight maneuver performed by the leading or following aircraft;
   an approach of another aircraft towards the leading aircraft or the following aircraft, and
   an impaired flight situation of at least one of the leading and following aircraft.

17. The method of claim 10 further comprising, while flying in the formation, automatically maneuvering the following aircraft to the optimal position from the safety position in response to a determination that the certain flight condition is no longer present.

* * * * *